J. E. LUSE.
VEHICLE SEAT CONSTRUCTION.
APPLICATION FILED AUG. 3, 1914.
1,157,880.
Patented Oct. 26, 1915.
2 SHEETS—SHEET 1.
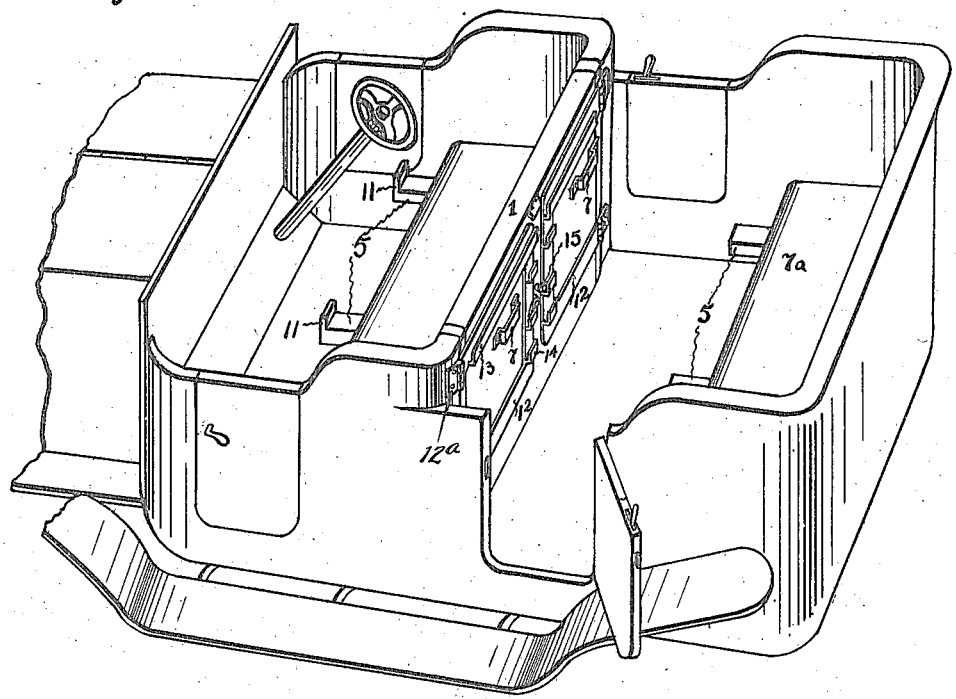
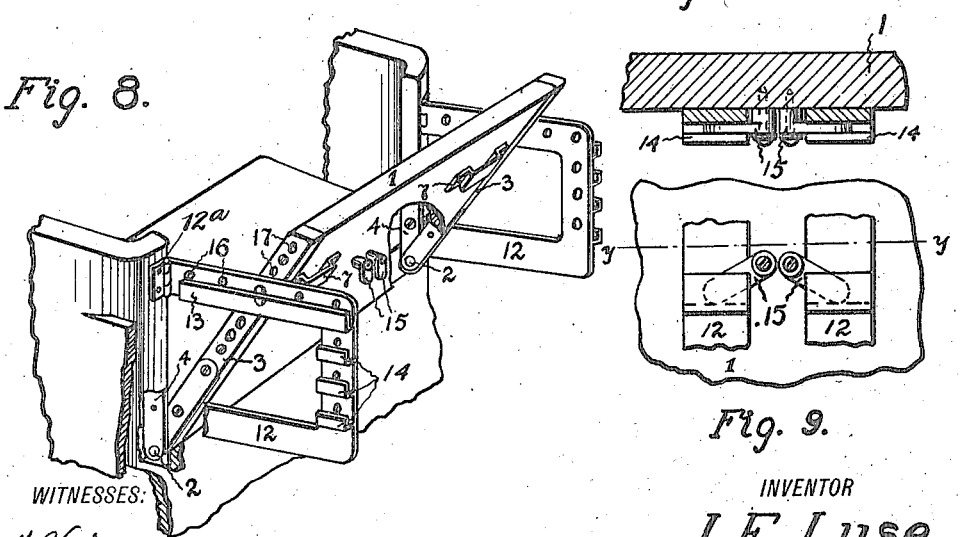
WITNESSES:
A. Victor
INVENTOR
J. E. Luse.
BY
John M. Spellman
ATTORNEY

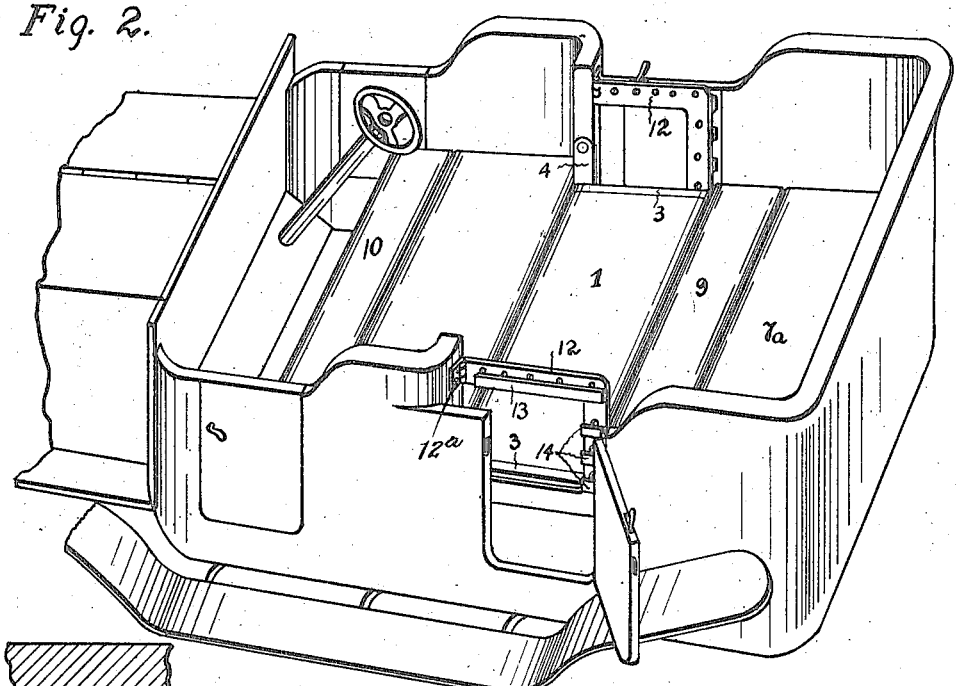
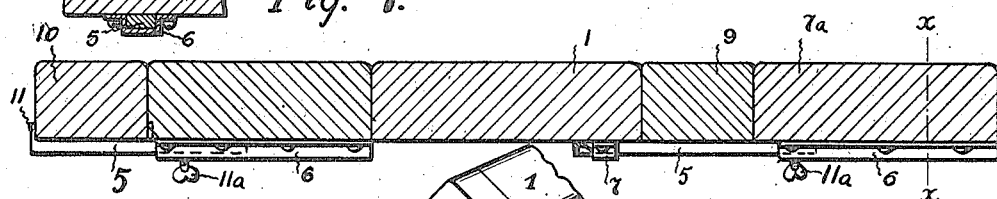
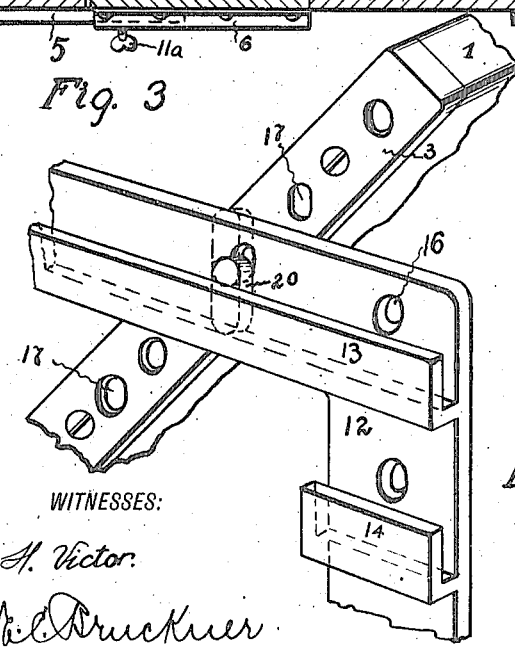
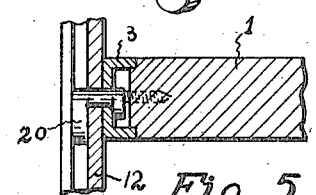

UNITED STATES PATENT OFFICE.

JONATHAN E. LUSE, OF CISCO, TEXAS.

VEHICLE SEAT CONSTRUCTION.

1,157,880.

Specification of Letters Patent.

Patented Oct. 26, 1915.

Application filed August 3, 1914. Serial No. 854,617.

*To all whom it may concern:*

Be it known that I, JONATHAN E. LUSE, a citizen of the United States, residing at Cisco, in the county of Eastland and State of Texas, have invented certain new and useful Improvements in Vehicle Seat Construction, of which the following is a specification.

My invention relates to a new and useful vehicle seat construction, and its object is to provide a construction whereby a two seated vehicle (and particularly an automobile) may be arranged to furnish sleeping accommodations by swinging the back of the front seat into a horizontal plane flush with the two seats.

A still further object of the invention is to provide a device of the character described that will be strong, durable, efficient and simple and comparatively inexpensive to produce, also one in which the several parts will not be likely to get out of working order.

With the above and other objects in view, the invention has relation to certain novel features of construction and operation, an example of which is described in the following specification and illustrated in the accompanying drawing, wherein:

Figure 1 is a perspective view of an automobile body showing my improved construction whereby the car may be used for sleeping, the parts however not being shown adjusted for such use. Fig. 2 is a similar view in which the car body is shown with the seats arranged to furnish sleeping accommodations. Fig. 3 is a longitudinal vertical sectional view of the seats adjusted as illustrated in Fig. 2. Fig. 4 is a detail perspective view showing the construction employed to hold the back of the front seat adjusted at various angles. Fig. 5 is a horizontal sectional detail showing an edge portion of the adjustable back of the front seat. Fig. 6 is a detail perspective view of a swivel latch several of which are employed in my construction. Fig. 7 is a detail cross section on $x$—$x$ of Fig. 3. Fig. 8 is a perspective view showing the front seat with its back adjusted at an angle by means of my improvement. Fig. 9 is a detail rear view of certain fastening devices which are mounted upon the rear face of the adjustable back of the front seat. Fig. 10 is a detail sectional view of the same, the section being taken upon the line $y$—$y$ of Fig. 9.

Referring now more particularly to the drawings, wherein like reference characters designate similar parts in all the figures, the numeral 1 denotes the adjustable back of the front seat of a touring car, said back being pivoted at each side adjacent to its lower end as indicated at 2, so that it may swing to the horizontal position in which it is shown adjusted in Figs. 2 and 3. To each lateral edge of the member 1, there is secured rigidly a metal sheathing 3, the pivot pins 2 being respectively carried by the members 3. The pivot pins respectively engage in suitable apertures provided at the lower extremities of metal strips 4, one of which is secured to the vertical edge face of each side of the front seat. Normally the back 1 occupies the vertical position illustrated in Fig. 1, in which position it occupies the usual relation to the sides and cushions of the front seat. When it is desired to arrange the automobile so that it may furnish sleeping accommodations, the member 1 is swung rearwardly to a horizontal position (see Figs. 2 and 3) in which position it is supported by the forward ends of two slide bars 5 which extend into keepers 6 secured to the rear seat, said bars 5 being completely housed in the keepers 6 under normal conditions. The keeper members 7 are secured to the rear surface of the member 1 at each side thereof, and in the horizontal position of said member the forward ends of the bars 5 are slid into the keepers 7.

The space intervening between the member 1 in its horizontal position and the rear seat 7ª is filled by an elongated supporting cushion 9, the ends of which rest upon the bars 5. With the front seat there is also correlated a pair of slide bars 5 which normally are held in the keeper 6. To complete the arrangement whereby sleeping accommodations are provided, a cushion 10 similar to the cushion 9 is mounted flush with the front seat with its extremities respectively supported by bars 5, said bars being formed with up-turned front ends 11 which, when the bars 5 are properly adjusted will press the cushion 10 rearwardly against the front seat. In order to hold each bar 5 adjusted either when recessed in the correlated keeper 6 or when projecting therefrom, a thumb screw 11ª is mounted in each keeper and is adapted to be screwed up tight against the correlated bars 5.

A description will now be given of the means which I employ to hold the back 1 of the front seat either in its normal vertical position or in adjustment at any desired inclination. At the side edges of the back of the front seat there are respectively hung U-shaped frames 12, a swinging connection being established between the ends of each frame and side edges of the seat back as indicated at 12$^a$. Each frame 12 is adapted to swing through an arc of substantially ninety degrees, in one limiting position being contiguous with the rear face of the member 1 as is shown in Fig. 1, and in the other limiting position being extended rearwardly as is shown in Fig. 2. An angular strip of metal 13 is secured to the rear face of each frame 12 adjacent to the top thereof, a channel being formed by said strip and frames 12 in conjunction. Three parallel metal strips 14 of shorter length are secured in a vertical spaced relation to the vertical portion of each frame 12. When the member 1 is in its normal vertical position, and the frames 12 are swung against the back of said member, as shown in Fig. 1, a pair of members 15 of a rocker arm type are swung into the channels formed by two of the strips 14 and the frames 12 are thus locked against longitudinal displacement so that they hold the member 1 vertical.

If it be desired to adjust the member 1 at an inclination as is shown in Fig. 8, the frames 12 are swung to their parallel positions and the member 1 is adjusted at the desired angle between said frames. The fastening device illustrated in Fig. 6 is then used to establish a connection between the member 1 and the frames 12 to hold the former in its adjusted position. This locking member comprises a pin 18 from the sides of which arms 19 and 20 project in the same direction, the arm 19 being considerably shorter than the arm 20. In the horizontal upper portion of each frame 12 and in the vertical portion thereof, there is formed a plurality of oval apertures proportioned to give passage to that end of the pin 18 which is carried by the arm 19. A similar set of equally spaced apertures 17 are formed in each member 3. When one of the devices shown in Fig. 6 is passed through one of the apertures 16 of each member 12 and through one of the apertures 17 of the correlated member 3 and is then subjected to a rotation such as to bring the arms 19 and 20 to a downwardly projecting position, the member 1 will be fixed in its inclined position.

The invention is presented as including all such modifications and changes as properly come within the scope of the following claim.

What I claim is:

In a vehicle seat construction comprising a front and rear seat each having a back, the back of the front seat being pivoted at the bottom to swing backward toward the rear seat, two U-shaped frames hinged to the sides of the front seat to swing at right angles away from said seat back said frames provided with means coöperating with the edges of the seat back to sustain said back in varying angles of adjustment and means carried by the frames coöperating with latches on the back of the seat and adapted to lock the back in normal vertical position.

In testimony whereof I have signed my name to this specification in the presence of two subscribing witnesses.

JONATHAN E. LUSE.

Witnesses:
M. L. LUSE,
M. S. STAMPS.

Copies of this patent may be obtained for five cents each, by addressing the "Commissioner of Patents, Washington, D. C."